US005798621A

United States Patent [19]
Truskalo et al.

[11] Patent Number: 5,798,621
[45] Date of Patent: Aug. 25, 1998

[54] HORIZONTAL DEFLECTION CIRCUIT WITH RASTER CORRECTION

[75] Inventors: Walter Truskalo; Peter Ronald Knight, both of Indianapolis; Lawrence Edward Smith, Noblesville, all of Ind.

[73] Assignee: Thomson Consumer Electronics, Inc., Indianapolis, Id.

[21] Appl. No.: 617,335

[22] Filed: Mar. 18, 1996

[51] Int. Cl.$^6$ .................. G09G 1/04; H01J 29/54
[52] U.S. Cl. ................................ 315/371; 315/398
[58] Field of Search .................... 315/398, 395, 315/370, 371, 408, 393; 348/806, 746

[56] References Cited

U.S. PATENT DOCUMENTS

| | | | |
|---|---|---|---|
| 3,814,981 | 6/1974 | Rusk | 315/398 |
| 3,944,882 | 3/1976 | Takahashi | 315/398 |
| 4,063,134 | 12/1977 | Iida | 315/371 |
| 4,482,846 | 11/1984 | Worster | 315/371 |
| 4,594,534 | 6/1986 | Haferl | 315/408 |
| 4,719,392 | 1/1988 | Haferl | 315/371 |
| 4,845,409 | 7/1989 | Oliver | 315/371 |
| 5,182,504 | 1/1993 | Haferl | 315/370 |
| 5,194,784 | 3/1993 | Tripod | 315/371 |
| 5,402,044 | 3/1995 | Haferl | 315/371 |
| 5,444,338 | 8/1995 | George et al. | 315/371 |
| 5,448,140 | 9/1995 | Douken et al. | 315/371 |

FOREIGN PATENT DOCUMENTS

04-157982  5/1992  Japan .................. H04N 3/23

*Primary Examiner*—Gregory C. Issing
*Attorney, Agent, or Firm*—Joseph S. Tripoli; Joseph J. Laks; Marion P. Metelski

[57] ABSTRACT

An electron beam tends to slope downwardly as it is deflected horizontally to form a raster in a video display apparatus. The sloping of the beam can cause geometric errors in the raster, for example, orthogonality and parallelogram errors. A raster correction circuit offsets orthogonality and parallelogram errors in a raster by modulating a horizontal deflection current at a vertical scanning rate. The raster correction current is phased in relation to a horizontal-rate deflection current such that scan lines in an upper-half portion of the raster are shifted to the right, and scan lines in a lower-half portion of the raster are shifted to the left.

17 Claims, 7 Drawing Sheets

HORIZONTAL DEFLECTION CIRCUIT WITH RASTER CORRECTION

BACKGROUND OF THE INVENTION

1. Field of the Invention

This invention relates generally to the field of raster correction circuits, and, in particular, to a circuit used to correct orthogonality and parallelogram errors in a raster of a cathode ray tube of a video display apparatus.

2. Description of Prior Art

In a cathode ray tube (CRT) of a video display apparatus, a raster is formed by deflecting at least one electron beam across a phosphor screen. Each electron beam is deflected in a horizontal direction by a magnetic field produced by the excitation of a horizontal deflection coil by a horizontal-rate sawtooth current. Likewise, each electron beam is simultaneously deflected in a vertical direction by a magnetic field produced by the excitation of a vertical deflection coil by a vertical-rate sawtooth current. The result is a negatively-sloped, or "downhill", scan line as the electron beam is deflected from left to right to form the CRT's raster. In a typical cathode ray tube used in a color television receiver and having a screen width of approximately 723 mm and a screen height of approximately 538 mm, a horizontal scan line may drop a distance of approximately 2.4 mm from a perfectly horizontal position in one field.

Figure 1:
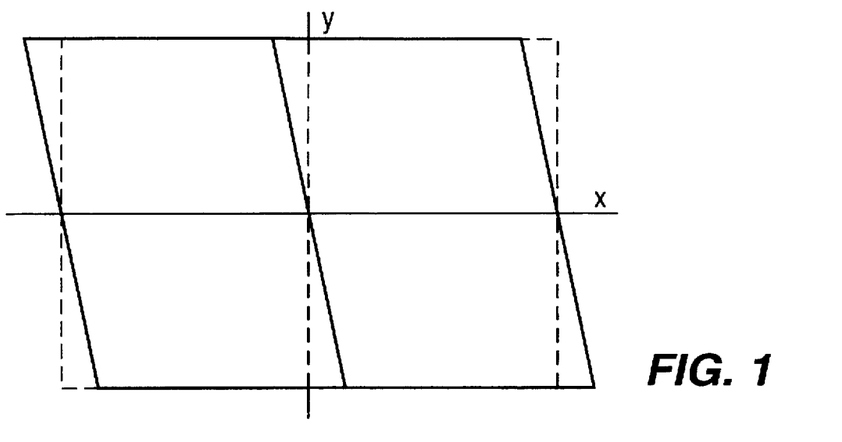
FIG. 1 shows a raster having orthogonality and parallelogram errors.

This downhill scan effect introduces both orthogonality and parallelogram errors into the raster, as shown in FIG. 1. In a perfectly rectangular raster, horizontal and vertical center lines are orthogonal, or perpendicular, to one another. Downhill scanning does not produce a perfectly rectangular raster and hence results in a non-orthogonal relationship between the horizontal and vertical center lines of the raster.

Figure 2:
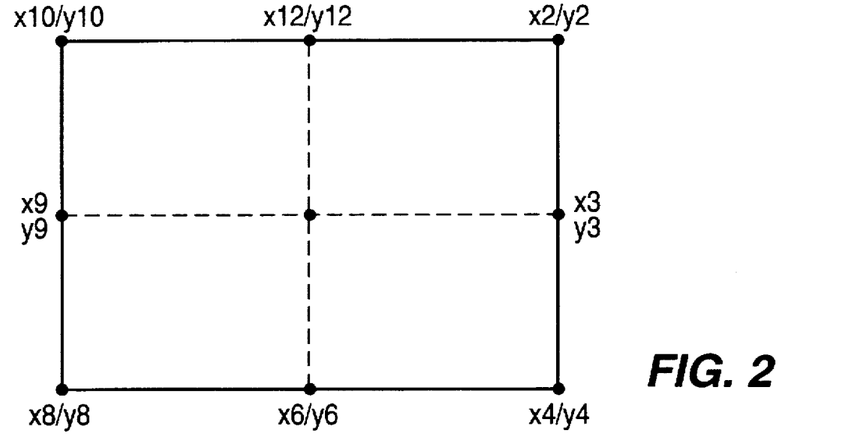
FIG. 2 describes a raster of a cathode ray tube in terms of X and Y co-ordinates.

Orthogonality error is a quantitative measure, expressed in units of radians or degrees, of the extent to which the horizontal and vertical center lines of a raster depart from orthogonality. For a raster represented in terms of X and Y co-ordinates, as depicted in FIG. 2, the orthogonality error can be calculated with the following trigonometric formula:

$$\tan^{-1}\left(\frac{X12-X6}{Y12-Y6}\right)+\tan^{-1}\left(\frac{Y3-Y9}{X3-X9}\right).$$

A conventional downhill scan may produce an orthogonality error on the order of approximately 0.2°. A typical design tolerance for the orthogonality error in a CRT may be specified as ±0.3°.

The orthogonality error may be magnified at the left and right edges of the raster because, as is well-known, the deflection sensitivity of an electron beam increases as it approaches an edge of the raster. As a result, the edges of the raster may tilt such that the raster has a generally parallelogram shape.

Parallelogram error is a quantitative measure, expressed in units of radians or degrees, of the extent to which the shape of a raster approximates a parallelogram. For a raster represented in terms of X and Y co-ordinates, as depicted in FIG. 2, the vertical parallelogram error can be calculated with the following trigonometric formula:

$$\frac{\tan^{-1}\left(\frac{X10-X8}{Y10-Y8}\right)+\tan^{-1}\left(\frac{X2-X4}{Y2-Y4}\right)}{2}+\tan^{-1}\left(\frac{Y3-Y9}{X3-X9}\right).$$

The horizontal parallelogram error can be calculated with the following trigonometric formula:

$$\frac{\tan^{-1}\left(\frac{Y2-Y10}{X2-X10}\right)+\tan^{-1}\left(\frac{Y4-Y8}{X4-X8}\right)}{2}-\tan^{-1}\left(\frac{Y3-Y9}{X3-X9}\right).$$

In a conventional downhill scan, a typical orthogonality error may translate into a parallelogram error that is on the order of approximately 1.5 times the orthogonality error. For example, a conventional downhill scan that produces an orthogonality error of 0.2° may also produce a parallelogram error that is equal to approximately 0.3°. A typical design tolerance for the parallelogram error in a CRT may be specified as ±0.5°.

If means are employed to correct side, or east-west, pincushion distortion in a raster, the downhill scan effect may cause a misalignment of a pincushion correction current envelope with respect to the pincushion curvature on the raster. Mitigation of this misalignment may result in an increase in the parallelogram error by an amount that may equal approximately 80%. Thus, for a conventional downhill scan that produces a parallelogram error equal to approximately 0.3°, the use of side pincushion correction may increase the parallelogram error to approximately 0.6°.

It is desirable to completely eliminate both orthogonality and parallelogram errors in a raster so that a CRT may display the highest-quality image. One possible solution requires rotation of the horizontal deflection coil relative to the vertical deflection coil in order to align the sloped horizontal center line of the raster with the horizontal center line of the CRT. The downhill scan effect is thereby eliminated, but this approach can, nonetheless, be problematic. First, this solution can affect convergence in the video display apparatus. Second, as the sloped horizontal center line is rotated toward the center line of the CRT, the pincushion curvature on the raster also rotates in order to maintain its original relationship with the sloped horizontal center line. Thus, while this solution can eliminate the orthogonality error, it does not address the component of the parallelogram error due to misalignment of the pincushion correction current envelope with respect to the pincushion curvature on the raster.

SUMMARY OF THE INVENTION

A deflection circuit with raster correction according to the inventive arrangement taught herein provides vertical-rate modulation of a horizontal deflection current in a deflection coil of a cathode ray tube for correcting orthogonality and parallelogram errors in the raster.

Such a deflection circuit comprises: a deflection coil for forming a raster; and, means for generating a corrective current coupled to the deflection coil for establishing a substantially orthogonal relationship between left and right lateral edges of the raster, respectively, and a horizontal axis passing through a geometric center of the raster. The generating means may establish a substantially orthogonal relationship between horizontal and vertical axes that pass through a geometric center of the raster. The corrective current may have a vertical scanning rate and a substantially sawtooth shape.

According to a feature of an inventive arrangement taught herein, a deflection circuit for a video display apparatus comprises: a deflection coil for generating a raster responsive to a deflection current; and, means for modulating the deflection current to laterally shift a plurality of scan lines of the raster. The deflection current may be modulated at a vertical scanning rate.

Those of the plurality of scan lines in an upper portion of the raster may be shifted toward a first lateral edge of the raster, and those of the plurality of scan lines in a lower portion of the raster may be shifted toward a second lateral edge of the raster opposite the first lateral edge. The shifting of the plurality of scan lines may result in a substantially orthogonal relationship between the first and second lateral edges of the raster, respectively, and a horizontal axis passing through a geometric center of the raster. The shifting of the plurality of scan lines may also result in a substantially orthogonal relationship between horizontal and vertical axes that pass through a geometric center of the raster.

The modulating means may comprise first and second active devices, each having first and second terminals coupled, respectively, to first and second terminals of the horizontal deflection coil, wherein the first and second active devices modulate the deflection current during distinct portions of each vertical scan period. One of the active devices may be biased to fully conduct during a period when the other of the active devices is modulating the deflection current. Modulation of the deflection current may be accomplished by linearly varying a conductivity of the other of the active devices during a portion of a vertical scan interval.

A horizontal deflection system for a video display apparatus, which incorporates an inventive arrangement taught herein, comprises: a horizontal deflection coil for generating a raster; a centering network coupled in parallel with the deflection coil for positioning an electron beam at a geometric center of the raster, the centering network comprising a series interconnection of a centering coil and a centering capacitor; and, first and second active devices for generating a voltage across the centering capacitor, wherein the voltage attains a minimum peak magnitude near a vertical center of the raster and a maximum peak magnitude at top and bottom edges of the raster. A time period between corresponding peak magnitudes of the voltage may be equal to approximately a vertical scanning period.

The voltage may supply the horizontal deflection coil with a corrective current in a direction for establishing a substantially orthogonal relationship between left and right lateral edges of the raster, respectively, and a horizontal axis passing through a geometric center of the raster. The voltage may also supply the horizontal deflection coil with a corrective current in a direction for establishing a substantially orthogonal relationship between horizontal and vertical axes that pass through a geometric center of the raster. The corrective current may have a substantially sawtooth shape.

The above, and other features and advantages of the present invention will become apparent from the following description read in conjunction with the accompanying drawings, in which like reference numerals designate the same elements.

DETAILED DESCRIPTION OF THE PREFERRED EMBODIMENTS

Figure 3:
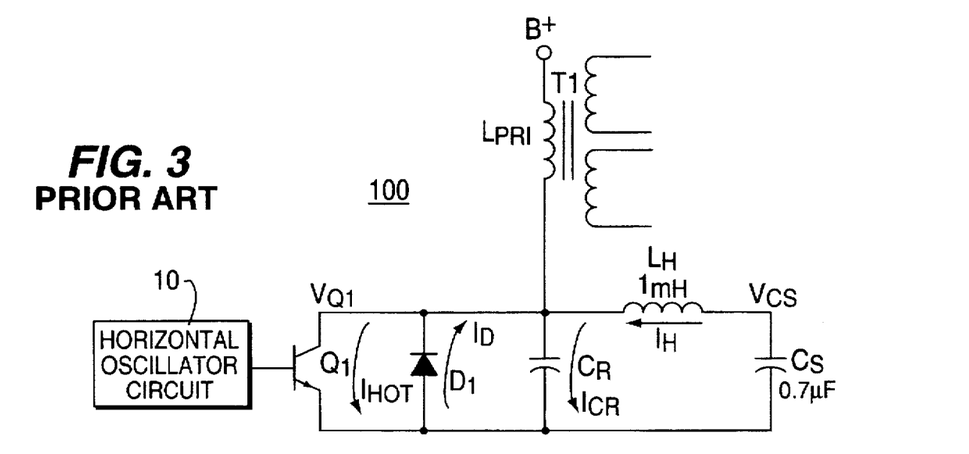
FIG. 3 shows a conventional horizontal deflection circuit.

A conventional horizontal deflection circuit 100 is shown in FIG. 3 and its associated voltage and current waveforms are shown in FIG. 4. Current flow is defined as positive in the directions indicated in FIG. 3.

Referring to FIGS. 3 and 4, a B$^+$voltage of approximately 140 V$_{dc}$ is impressed across S-correction capacitor C$_S$ through a primary winding L$_{PRI}$ of a high-voltage transformer T1. As an electron beam is deflected to an upper left-hand corner of a raster, horizontal output transistor Q1 does not conduct a current. Energy previously stored in horizontal deflection coil L$_H$ causes a current to flow through forward-biased damper diode D1 and horizontal deflection coil L$_H$ and into S-correction capacitor C$_S$. At this point both damper current I$_D$ and horizontal deflection current I$_H$ attain their peak negative values.

When the electron beam reaches the center of the raster, the energy stored in horizontal deflection coil L$_H$ has decayed to zero and horizontal deflection current I$_H$ and damper current I$_D$ are equal to approximately zero. Damper diode D1 becomes reverse biased and horizontal oscillator circuit 10 causes horizontal output transistor Q1 to conduct a current I$_{HOT}$. Horizontal deflection current IH reverses direction, and energy supplied to horizontal deflection coil L$_H$ by S-correction capacitor C$_S$ allows horizontal deflection current I$_H$ to increase linearly.

When the electron beam reaches the right edge of the raster, horizontal oscillator circuit 10 causes horizontal output transistor Q1 to discontinue conducting current I$_{HOT}$ and damper diode D1 remains reverse biased. During this retrace interval, the decaying horizontal deflection current I$_H$ flows rapidly into the retrace capacitor C$_R$. When horizontal deflection current I$_H$ decays to approximately zero, it reverses direction and is then supplied by retrace capacitor C$_R$. Once retrace capacitor C$_R$ has discharged its stored energy through horizontal deflection coil L$_H$, the electron beam has been returned to the upper left-hand corner of the raster, and the process repeats.

In a raster having a negative orthogonality error, as shown in FIG. 1, the raster has a generally parallelogram shape, with the lines in the top half of the raster shifted to the left and the lines in the bottom half of the raster shifted to the right. A generally rectangular raster can be obtained from the generally parallelogram raster of FIG. 1 by appropriately shifting the scan lines in top and bottom halves of the raster. For instance, in the generally parallelogram raster of FIG. 1, the lines in the top half of the raster can be shifted to the right and the lines in the bottom half of the raster can be shifted to the left.

Figure 4A:
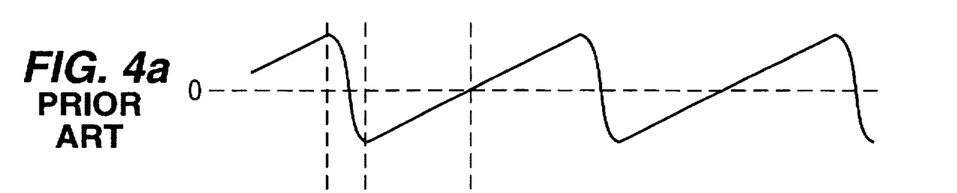
FIG. 4 shows voltage and current waveforms associated with the conventional horizontal deflection circuit of FIG. 3.
Figure 4B:
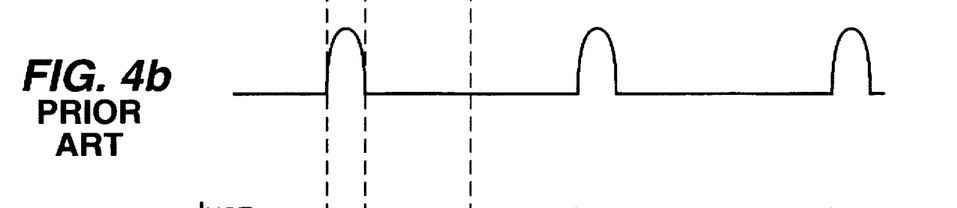
Figure 4C:
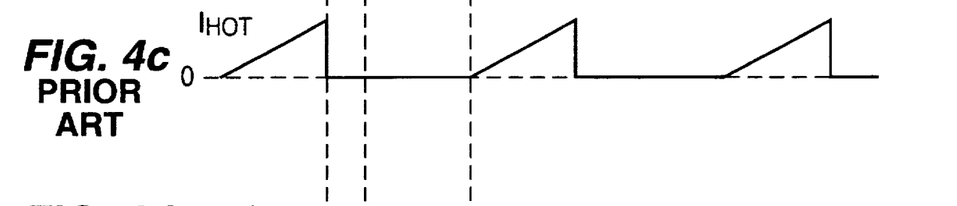
Figures 4D, 4E:
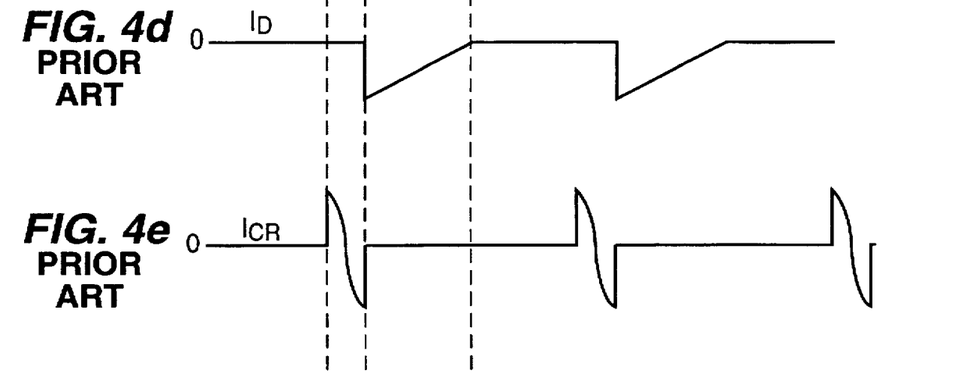
Figure 4F:
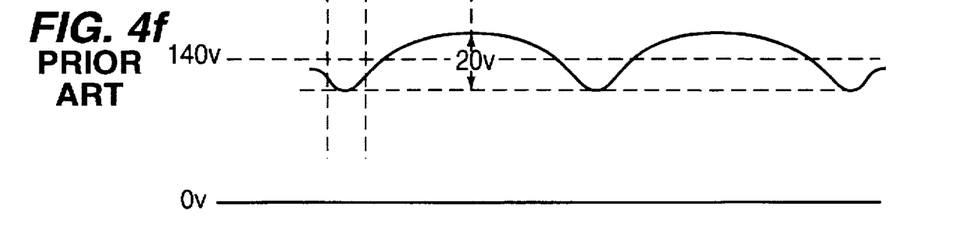

An appropriate shifting of the lines in the respective halves of a raster can be accomplished by modulating the horizontal deflection current $I_H$ with a vertical-rate raster correction current $I_{O/P}$ as the electron beam is deflected to scan the raster. 20 Referring to FIGS. 4(a), 4(c) and 4(d), the trace portion of horizontal deflection current $I_H$ is the sum of damper current $I_D$, which flows through damper diode D1 as the electron beam travels from the left edge of the raster to its center, and current $I_{HOT}$, which flows through horizontal output transistor Q1 as the electron beam sweeps from the center of the raster to its right edge. Thus, a generally parallelogram-shaped raster of the type shown in FIG. 1 generally indicates that, in the upper half of the raster, the electron beam is disproportionately deflected by current flowing through horizontal deflection coil $L_H$ in the direction of damper current $I_D$. Similarly, in the lower half of the raster, the electron beam is disproportionately deflected by current flowing through horizontal deflection coil $L_H$ in the direction of current $I_{HOT}$. Thus, in order to generate a generally rectangular raster, raster correction current $I_{O/P}$ should flow through horizontal deflection coil $L_H$ in the same direction as current $I_{HOT}$ in the upper half of the raster, and should flow through horizontal deflection coil $L_H$ in the same direction as damper current $I_D$ in the lower half of the raster.

Figure 5:
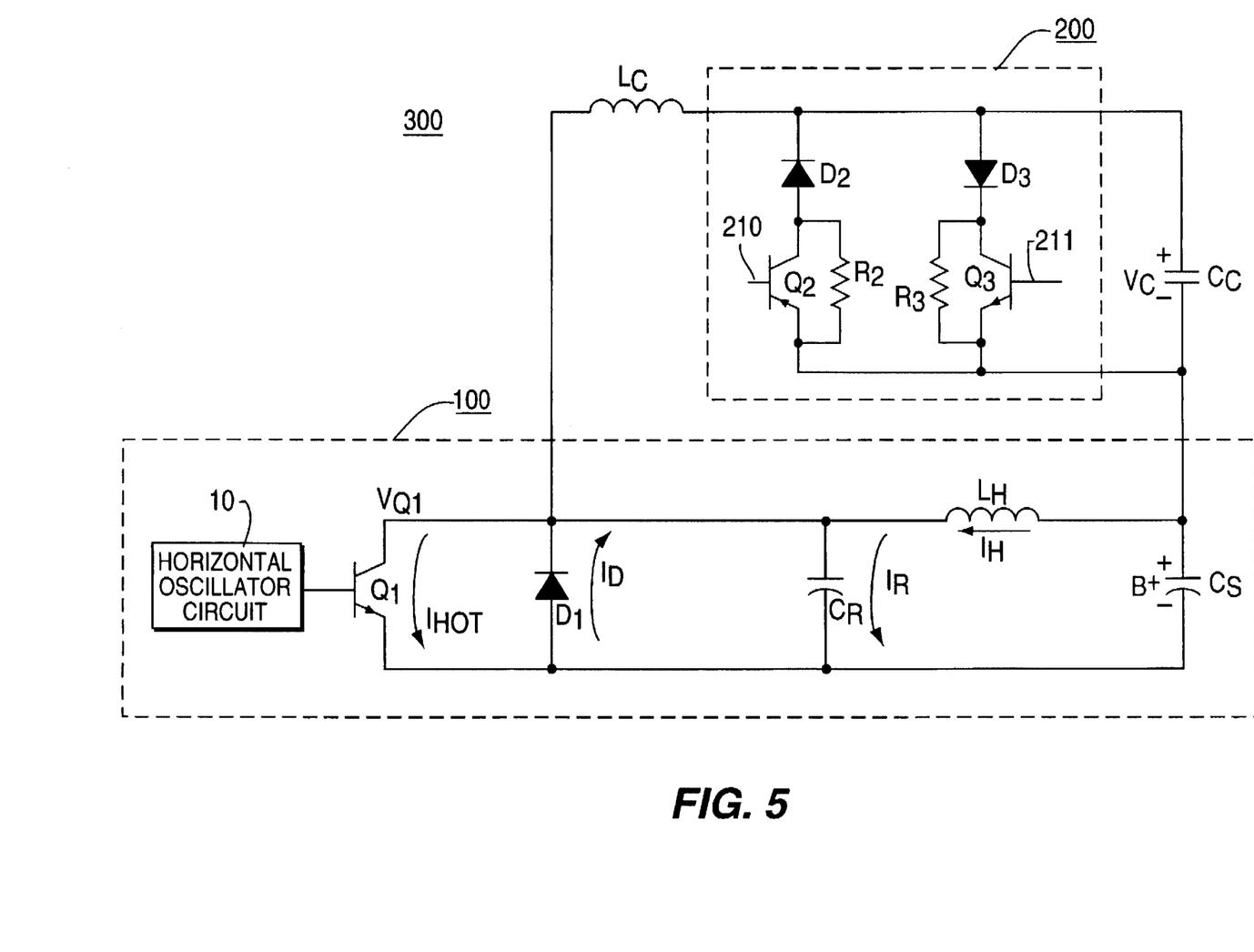
FIG. 5 shows a horizontal deflection system having an inventive arrangement described herein.
Figure 6:
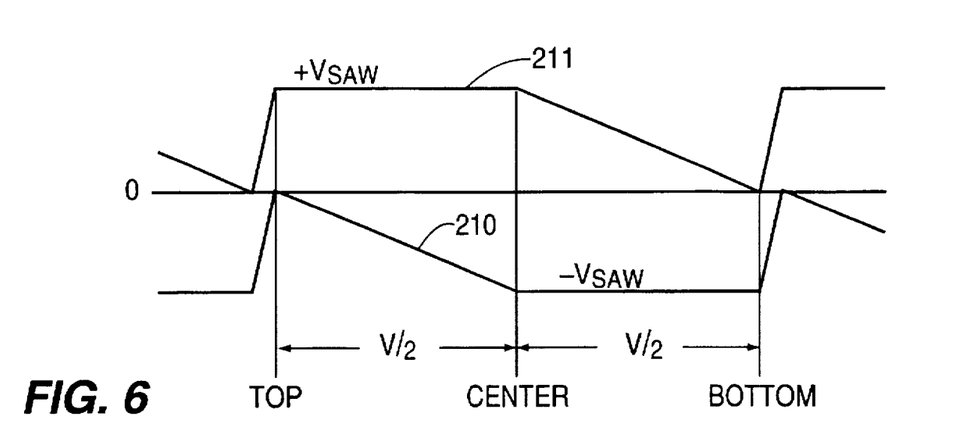
FIG. 6 shows voltage waveforms associated with an inventive arrangement described herein.

In a horizontal deflection system 300, shown in FIG. 5, a raster correction circuit 200 can be coupled to horizontal deflection circuit 100 in order to appropriately shift the scan lines in the top and bottom halves of a generally parallelogram raster to produce a generally rectangular raster. Referring to FIG. 5, raster correction circuit 200 is coupled to the horizontal deflection coil $L_H$ through a raster centering network comprising inductor $L_C$ and capacitor $C_C$. Inductor $L_C$ typically has a greater inductance, and hence conducts a lower peak-to-peak current, than does horizontal deflection coil $L_H$. Vertical-rate sawtooth voltage waveforms 210 and 211, which are shown in FIG. 6, drive transistors Q2 and Q3, respectively, so that a vertical-rate raster correction current $I_{O/P}$ flows in raster correction circuit 200. Sawtooth waveforms 210 and 211 may be generated by conventional means which are not described herein.

Referring to FIGS. 5 and 6, in an upper-half portion of the raster, sawtooth waveform 210 linearly modulates transistor Q2 from cut-off to saturation while sawtooth waveform 211 causes transistor Q3 to saturate. The operation of horizontal deflection system 300 can thus be explained with reference to an equivalent horizontal deflection system 300', shown in FIG. 7(a), wherein the parallel combination of transistor Q2 and resistor R2 is represented by a variable resistance $R_{EQ2}$, and transistor Q3 is represented by a closed switch SW3. Voltage polarities and current flows are defined as positive in the direction indicated on FIG. 7(a).

Figure 7A:
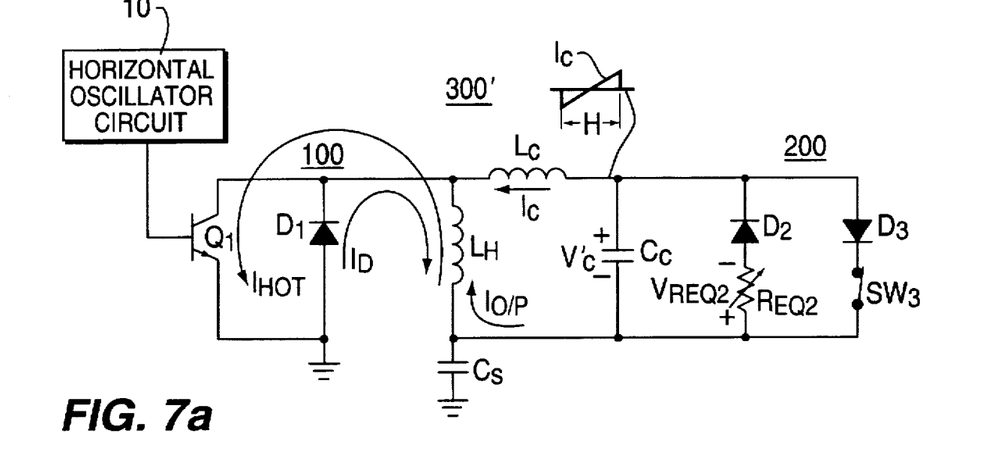
FIGS. 7 and 8 show equivalent circuits useful in describing the operation of the horizontal deflection system of FIG. 5.
Figure 7B:
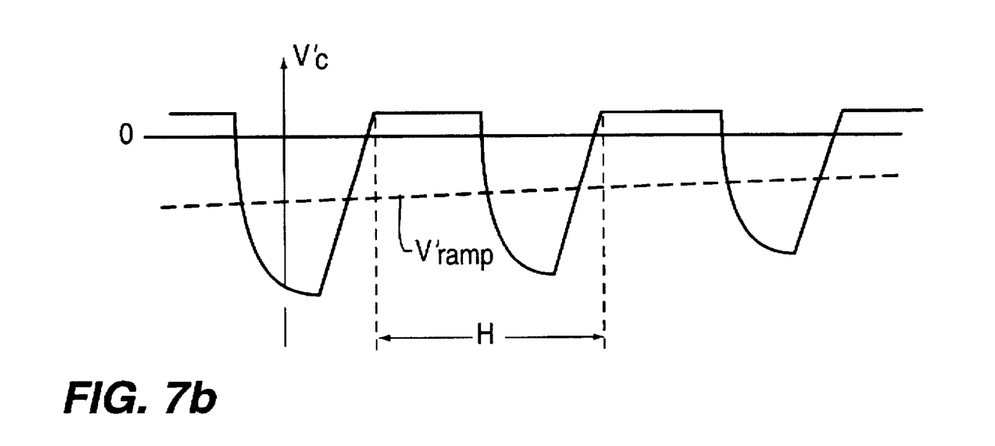

Referring to FIGS. 7(a) and 7(b), during a negative portion of horizontal deflection current $I_H$, which corresponds to the flow of damper current $I_D$ through horizontal deflection coil $L_H$ and, thus, to deflection of the electron beam from the left edge to the center of the raster, a negative portion of horizontal-rate centering current $I_C$ flows through centering inductor $L_C$. Diode D2 is reverse biased, diode D3 is forward biased, and horizontal-rate centering current $I_C$ charges S-correction capacitor $C_S$ through diode D3 and switch SW3. A small, positive centering voltage $V'_C$, clamped to approximately the sum of the forward voltage drop of diode D3 and the saturation voltage from collector to emitter of transistor Q3, is also established across centering capacitor $C_C$.

As the electron beam reaches the center of the raster, the horizontal deflection current $I_H$ reverses direction and becomes positive, which corresponds to the flow of current $I_{HOT}$ through horizontal deflection coil $L_H$ and, thus, to deflection of the electron beam from the center to the right edge of the raster. The horizontal centering current $I_C$ also becomes positive. Diode D2 is now forward biased, diode D3 is now reverse biased, and a horizontal-rate current flows through variable resistor $R_{EQ2}$ and diode D2. The centering voltage $V'_C$ becomes negative and is equal to approximately the voltage VREQ2 generated across variable resistance $R_{EQ2}$.

Successive negative peaks of centering voltage $V'_C$ decrease in magnitude because sawtooth waveform 210 drives transistor Q2 closer to saturation as successive horizontal lines are scanned in the upper half of the raster. Hence, the variable resistance $R_{EQ2}$, and, consequently, the magnitude of the voltage generated across variable resistance $R_{EQ2}$, decrease as the electron beam approaches the center of the vertical interval. This corresponds to the fact that, as shown in FIG. 1, the orthogonality and parallelogram errors become less severe, so that less correction is required, as the electron beam scans the top half of the raster.

Figure 9:
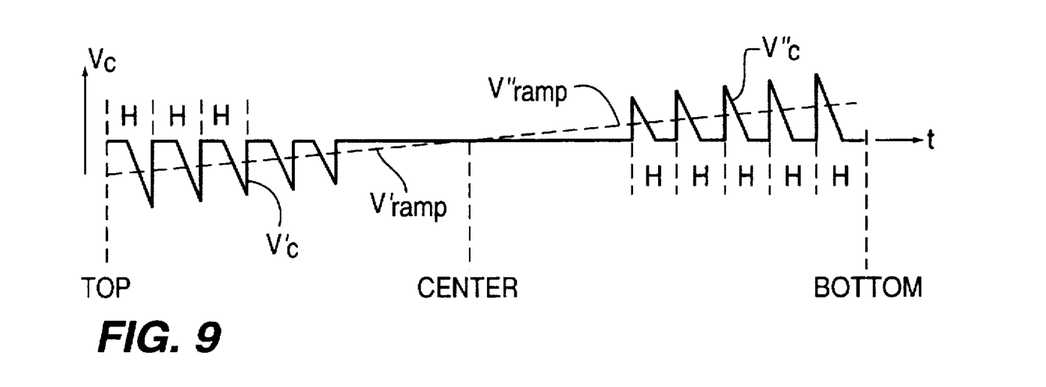
FIG. 9 shows a voltage waveform associated with an inventive arrangement described herein.

The successive decreasing in the magnitudes of the negative peaks of centering voltage $V'_C$ produces a vertical-rate voltage ramp $V'_{ramp}$, as shown in FIGS. 7(b) and 9. Voltage ramp $V'_{ramp}$ generates correction current $I_{O/P}$ through horizontal deflection coil $L_H$ in the same direction as current $I_{HOT}$. Thus, the magnetic field induced in horizontal deflection coil $L_H$ by raster correction current $I_{O/P}$ advantageously supplements the magnetic field induced in the coil by current $I_{HOT}$ during deflection of the electron beam from the center to the right edge of the raster. The scan line thereby tends to deflect further to the right.

In a lower-half portion of the raster, the roles of transistors Q2 and Q3 are reversed. Sawtooth waveform 210 causes transistor Q2 to saturate while sawtooth waveform 211 linearly modulates transistor Q3 from saturation to cut-off. Horizontal deflection system 300 can thus be represented by an equivalent horizontal deflection system 300", shown in FIG. 8(a), wherein transistor Q2 is represented by a closed switch SW2, and the parallel combination of transistor Q3 and resistor R3 is represented by a variable resistance $R_{EQ3}$. Voltage polarities and current flows are defined as positive in the direction indicated on FIG. 8(a).

Figure 8A:
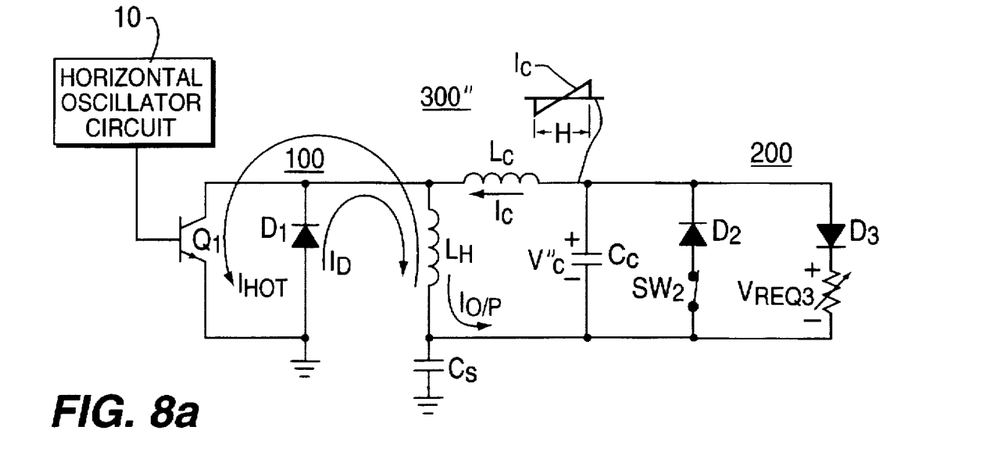
Figure 8B:
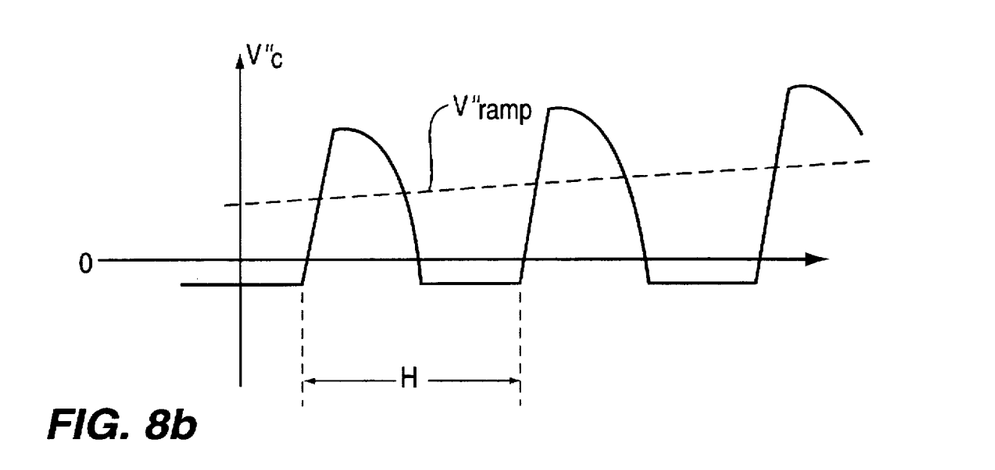

Referring to FIGS. 8(a) and 8(b), during a negative portion of horizontal deflection current $I_H$, which corresponds to the flow of damper current $I_D$ through horizontal deflection coil $L_H$ and, thus, to deflection of the electron beam from the left edge to the center of the raster, a negative portion of horizontal-rate centering current $I_C$ flows through centering inductor $L_C$. Diode D2 is reverse biased, diode D3 is forward biased, and horizontal-rate centering current $I_C$ charges S-correction capacitor $C_S$ through diode D3 and variable resistance $R_{EQ3}$. A positive centering voltage $V''_C$ is established across centering -capacitor $C_C$ and is equal to approximately the voltage $V_{REQ3}$ generated across variable resistance $R_{EQ3}$.

As the electron beam reaches the center of the raster, the horizontal deflection current $I_H$ reverses direction and becomes positive, which corresponds to the flow of current $I_{HOT}$ through horizontal deflection coil $L_H$ and, thus, to deflection of the electron beam from the center to the right edge of the raster. The horizontal centering current $I_C$ also becomes positive. Diode D2 is now forward biased, diode D3 is now reverse biased, and a horizontal-rate current flows through switch SW2 and diode D2. The centering voltage $V''_C$ becomes negative and is clamped to approximately the sum of the forward voltage drop of diode D2 and the saturation voltage from collector to emitter of transistor Q2.

Successive positive peaks of centering voltage V"$_C$ increase in magnitude because sawtooth current waveform 211 drives transistor Q3 linearly toward cutoff as successive horizontal lines are scanned in the lower half of the raster. Hence, the variable resistance R$_{EQ3}$, and, consequently, the magnitude of the voltage generated across variable resistance R$_{EQ3}$, increase as the electron beam approaches the bottom of the vertical interval. This corresponds to the fact that, as shown in FIG. 1, the orthogonality and parallelogram errors become more severe, so that more correction is required, as the electron beam scans the bottom half of the raster.

The successive increasing in the magnitudes of the positive peaks of centering voltage V"$_C$ produces a vertical-rate voltage ramp V"$_{ramp}$, as shown in FIGS. 8(b) and 9. Voltage ramp V"ramp generates correction current I$_{O/P}$ through horizontal deflection coil L$_H$ in the same direction as current I$_D$. Thus, the magnetic field induced in horizontal deflection coil L$_H$ by raster correction current I$_{O/P}$ advantageously supplements the magnetic field induced in the coil by current I$_D$ during deflection of the electron beam from the left edge to the center of the raster. The scan line thereby tends to deflect further to the left.

Diodes D2 and D3 in raster correction circuit 200 may be used as necessary to protect transistors Q2 and Q3 from damage or destruction due to overvoltage stresses that may appear when transistors Q2 and Q3 transition from conducting to nonconducting states.

Resistors R2 and R3 are components of the variable resistances R$_{EQ2}$ and R$_{EQ3}$, respectively, of FIGS. 7(a) and 8(a), respectively. Consequently, the values of resistors R2 and R3 affect the characteristics of the vertical-rate voltage ramps V'$_{ramp}$ and V"$_{ramp}$, respectively. A horizontal centering of the electron beam at the geometric center of the raster can thus be effectuated by an appropriate choice for the values of resistors R2 and R3, provided that the value of centering inductor L$_C$ is low enough to supply a required current.

The horizontal centering of the electron beam can also be adjusted by appropriately biasing vertical-rate sawtooth waveforms 210 and 211 to choose a particular zero-crossing point, at which transistors Q2 and Q3 reverse roles. For example, FIG. 9(a) shows sawtooth waveforms 210 and 211 arranged to show a zero crossing point. FIG. 9(b) shows sawtooth waveforms 210' and 211' after applying a dc bias to shift a zero-crossing point toward the right edge of the raster. FIG. 9(c) shows sawtooth waveforms 210" and 211" after applying a dc bias to shift a zero-crossing point toward the left edge of the raster.

If the dc bias shifts either of sawtooth waveforms 210 or 211 by an amount which exceeds either peak amplitude $-V_{SAW}$ or $+V_{SAW}$, respectively, then only one of transistors Q2 or Q3 of raster correction circuit 200 can modulate raster correction current I$_{O/P}$ during a vertical scan interval; the other transistor remains in saturation during the entire vertical scan interval. For example, if sawtooth waveform 211, is a dc voltage greater in magnitude than $+V_{SAW}$, transistor Q2 is saturated during the entire vertical scan interval, and raster correction current I$_{O/P}$ is modulated solely by transistor Q3. At the other extreme, if sawtooth waveform 210 is a dc voltage greater in magnitude than $-V_{SAW}$, transistor Q3 is saturated during the entire vertical scan interval, and raster correction current I$_{O/P}$ is modulated solely by transistor Q2.

Figure 10A:
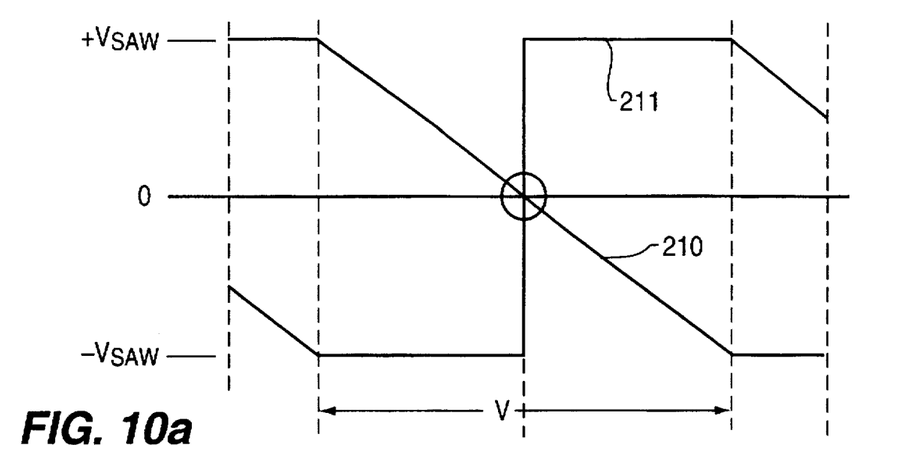
FIG. 10 shows voltage waveforms useful in describing an aspect of an inventive arrangement described herein.
Figure 10B:
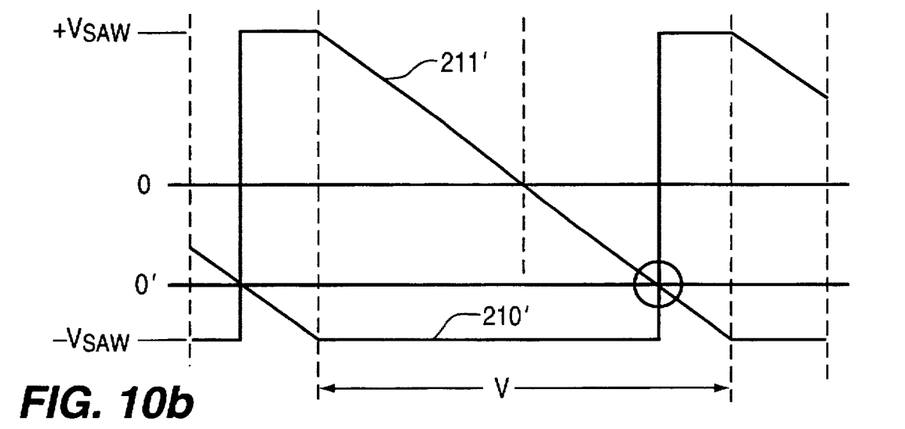
Figure 10C:
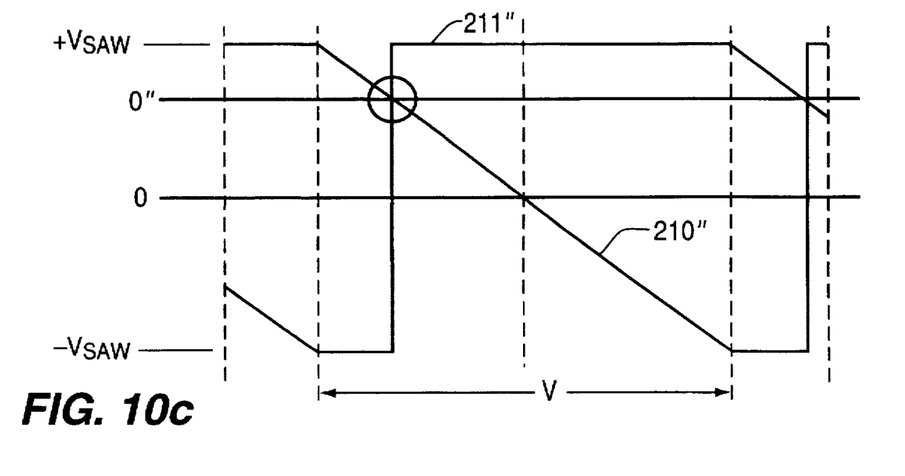
Figure 11:
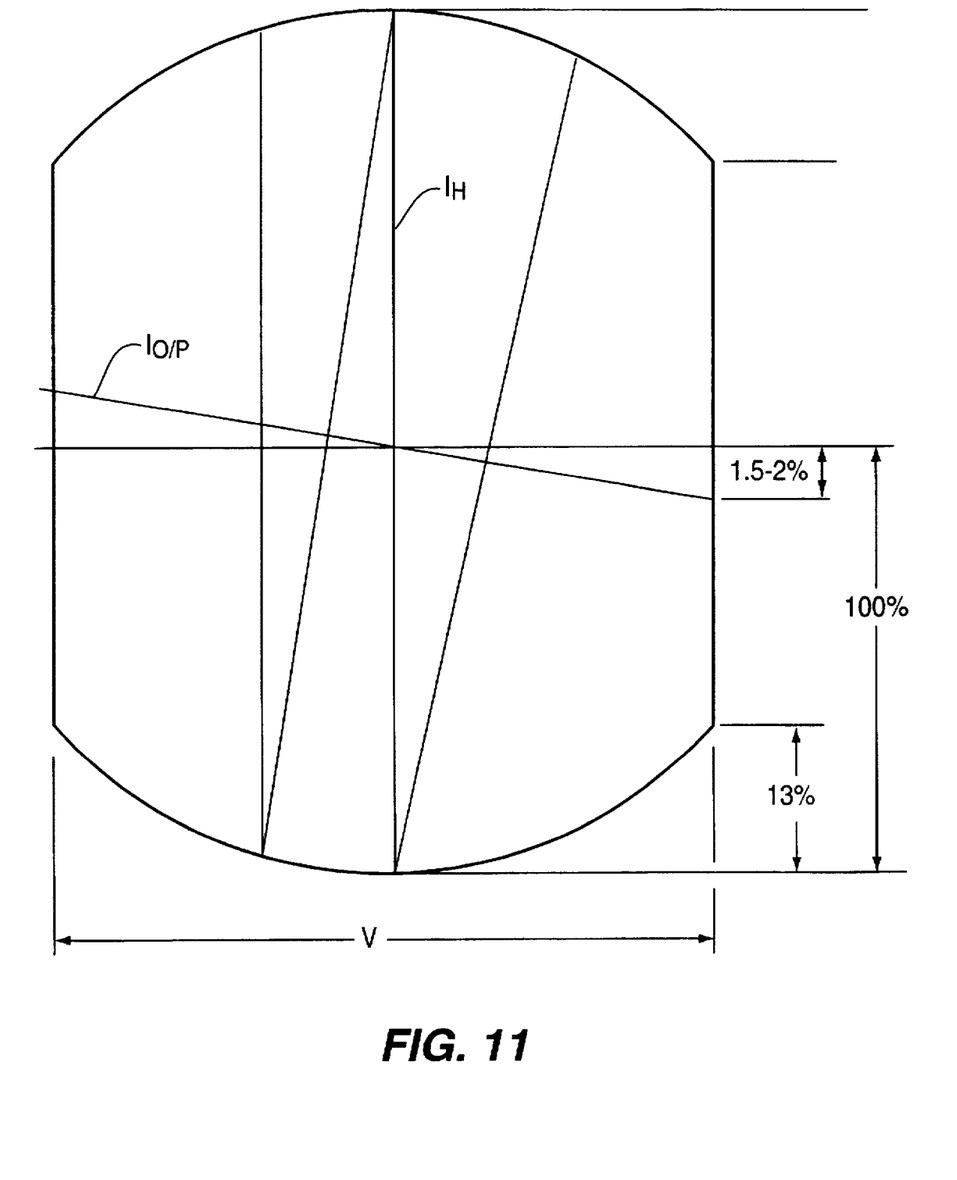
FIG. 11 shows current waveforms associated with an inventive arrangement described herein.

The preceding description of horizontal deflection system 300 demonstrates the salutary effect that raster correction circuit 200 provides for a raster suffering from the orthogonality and parallelogram errors inherently associated with the downhill scan effect. In an upper-half portion of the raster, raster correction current I$_{O/P}$ modulates horizontal deflection current IH to advantageously extend deflection of the electron beam further toward a right edge of the raster. In a lower-half portion of the raster, raster correction current I$_{O/P}$ modulates horizontal deflection current I$_H$ to advantageously extend deflection of the electron beam further toward a left edge of the raster. Referring to FIG. 10, the net effect of this modulation over one field is that a total current through a horizontal deflection coil L$_H$ is biased up as a superposition of the larger amplitude horizontal deflection current IH and the smaller amplitude raster correction current I$_{O/P}$.

Having described a preferred embodiment of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A deflection circuit for a video display apparatus, said circuit comprising:
   a deflection coil for generating a raster responsive to a deflection current; and,
   a parallel arrangement of first and second active devices coupled in parallel with said deflection coil such that each of said first and second active devices modulates said deflection current during a distinct portion of each vertical scan period to laterally shift a plurality of scan lines of said raster.

2. The deflection circuit of claim 1, wherein said first and second active devices are arranged such that said first and second active devices provide for conduction in opposite directions.

3. The deflection circuit of claim 2, wherein each of said first and second active devices is coupled in parallel with an impedance.

4. The deflection circuit of claim 3, wherein one of said active devices is biased to fully conduct during a period when the other of said active devices is modulating said deflection current.

5. The deflection circuit of claim 4, wherein modulation of said deflection current is accomplished by linearly varying a conductivity of said other of said active devices during a portion of a vertical scan interval.

6. The deflection circuit of claim 5, wherein said deflection current is modulated at a vertical scanning rate.

7. The deflection circuit of claim 6, wherein those of said plurality of scan lines in an upper portion of said raster are shifted toward a first lateral edge of said raster.

8. The deflection circuit of claim 7, wherein those of said plurality of scan lines in a lower portion of said raster are shifted toward a second lateral edge of said raster opposite said first lateral edge.

9. The deflection circuit of claim 8, wherein said shifting of said plurality of scan lines results in a substantially orthogonal relationship between said first and second lateral edges of said raster, respectively, and a horizontal axis passing through a geometric center of said raster.

10. The deflection circuit of claim 9, wherein said shifting of said plurality of scan lines results in a substantially orthogonal relationship between horizontal and vertical axes that pass through a geometric center of said raster.

11. A horizontal deflection system for a video display apparatus, said system comprising:

a horizontal deflection coil for generating a raster;

a centering network coupled in parallel with said deflection coil for positioning an electron beam at a geometric center of said raster, said centering network comprising a series interconnection of a centering coil and a centering capacitor; and, first and second active devices coupled in parallel with first and second impedances, respectively, for generating a voltage across said centering capacitor.

12. The horizontal deflection system of claim 11, wherein said voltage attains a minimum peak magnitude near a vertical center of said raster and a maximum peak magnitude at top and bottom edges of said raster.

13. The horizontal deflection system of claim 12, wherein peak magnitudes of said voltage vary linearly during said vertical scanning period.

14. The horizontal deflection system of claim 13, wherein a time period between corresponding peak magnitudes of said voltage is equal to approximately a vertical scanning period.

15. The horizontal deflection system of claim 14, wherein said voltage supplies said horizontal deflection coil with a corrective current in a direction for establishing a substantially orthogonal relationship between left and right lateral edges of said raster, respectively, and a horizontal axis passing through a geometric center of said raster.

16. The horizontal deflection system of claim 15, wherein said voltage supplies said horizontal deflection coil with a corrective current in a direction for establishing a substantially orthogonal relationship between horizontal and vertical axes that pass through a geometric center of said raster.

17. The horizontal deflection system of claim 16, wherein said corrective current has a substantially sawtooth shape.

* * * * *